Sept. 11, 1923.

W. H. PERRIGO

STAND FOR VELOCIPEDES

Filed April 10, 1922

1,467,908

Inventor
Warren H. Perrigo.

By Lacy & Lacy, Attorneys

Patented Sept. 11, 1923.

1,467,908

UNITED STATES PATENT OFFICE.

WARREN H. PERRIGO, OF ARLINGTON, WASHINGTON.

STAND FOR VELOCIPEDES.

Application filed April 10, 1922. Serial No. 551,163.

*To all whom it may concern:*

Be it known that I, WARREN H. PERRIGO, a citizen of the United States, residing at Arlington, in the county of Snohomish and State of Washington, have invented certain new and useful Improvements in Stands for Velocipedes, of which the following is a specification.

My present invention relates to an attachment for motorcycles or ordinary bicycles and the object of the invention is to provide a portable stand, that may be readily attached to any kind of velocipedes, but more particularly to motorcycles.

Another object of the invention is to so construct the device that it may be attached to, and form a part of, the ordinary stand usually found on motorcycles, or to entirely replace these stands.

Still another object of the invention is to provide a combined stand and lift, or, in other words, to build the stand in such a manner that it facilitates the raising of the hind wheel of a motorcycle when the stand is going to be used.

Ordinarily this requires great exertion of the rider as, for instance, if a machine weighs some five hundred pounds he must lift nearly three hundred pounds to raise the hind wheel from the ground when placing the stand in position.

The ordinary stand provided on motorcycles, which comprises a pair of legs connected at the bottom and hinged beneath the rear wheel axle, has the disadvantage that the base or foot of the stand is not broad enough to give a good support for the motorcycle, particularly when resting on an uneven or soft ground, when it often happens that a slight push or even the wind, will upset the motorcycle.

This disadvantage is entirely eliminated in the device forming the subject-matter of this specification, as the foot portion of the stand is very long so that it will not sink down even in soft ground when erected. Another advantage resides in the fact that the stand is constructed to constitute a lift or jack for the motor cycle, so that the rider does not need to exert himself to lift the machine off the ground, which is done by the pressure of his foot at the end of the stand, when sufficient force is used, so that the hind wheel is easily raised.

In the accompanying drawing one embodiment of the invention is illustrated and

Figure 3:
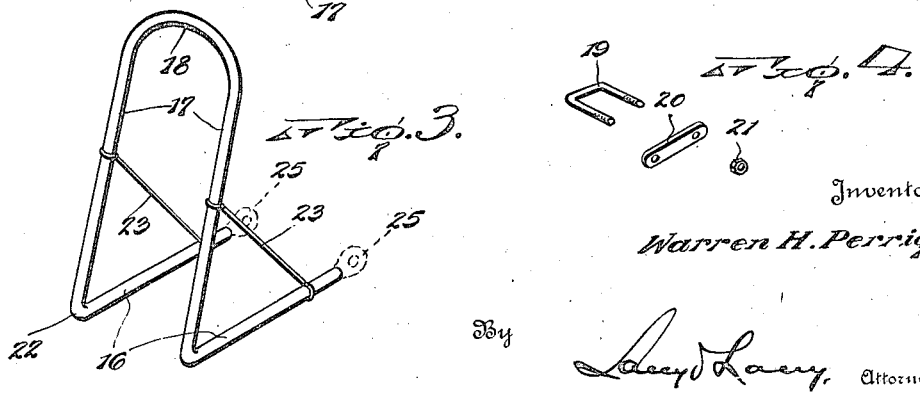
Figure 3 is a perspective view of the stand itself.
Figure 4:
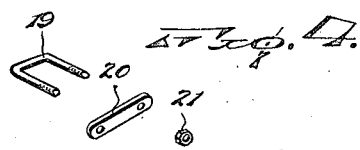
Figure 4 is another perspective view of one of the details.

The numeral 10 indicates the driving wheel of a motorcycle pivoted in a bearing 11. Below the axle 12 of the wheel is pivoted, as at 13, the stand 14 ordinarily provided on a motorcycle. This stand consists of a pair of depending arms connected at the free end by means of a cross bar which in travelling position is locked by means of a spring latch 15. My device now consists of a continuous bar as shown in Figure 3, that is to say, it consists of a pair of legs 16 and a foot portion 17 forming an arc 18 connecting the two sides thereof. The foot and leg portions are otherwise straight and the leg portions 16 are attached to the stand 14 by means of clips 19, bands 20 and nuts 21, which embrace the arms of the stand 14 and form a rigid connection between the latter and the leg portions 16. At the junction between the leg portions 16 and the foot portion 17 a heel 22 of less than ninety degrees extent is formed and braces 23 running across the heels and secured to the foot and leg portions, as best seen in Figure 3, may also be provided to increase the strength of the construction at the heels 22.

Instead of attaching this device to existing stands 14, I may pivot the upper ends of the leg portions 16 directly on the bearings 11 of the motorcycle, in which case the clips 19 will be unnecessary, eyelets 25 being furnished on the legs 16 instead.

Figure 1:
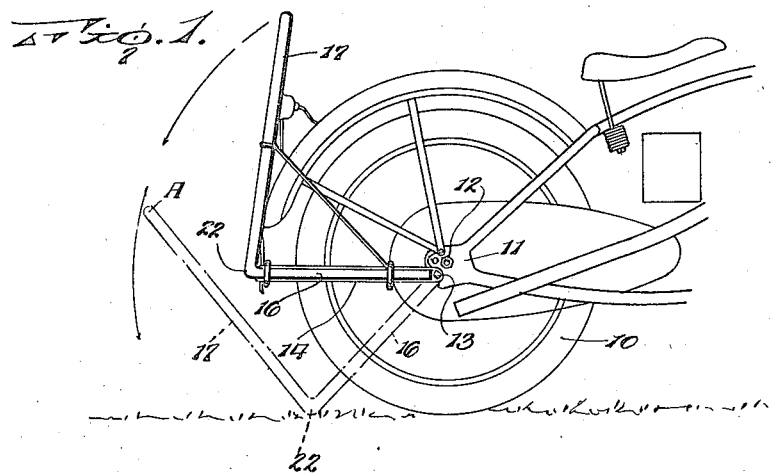
Figure 1 shows a side elevation of the rear portion of a motorcycle with the stand attached, raised in travelling position.
Figure 2:
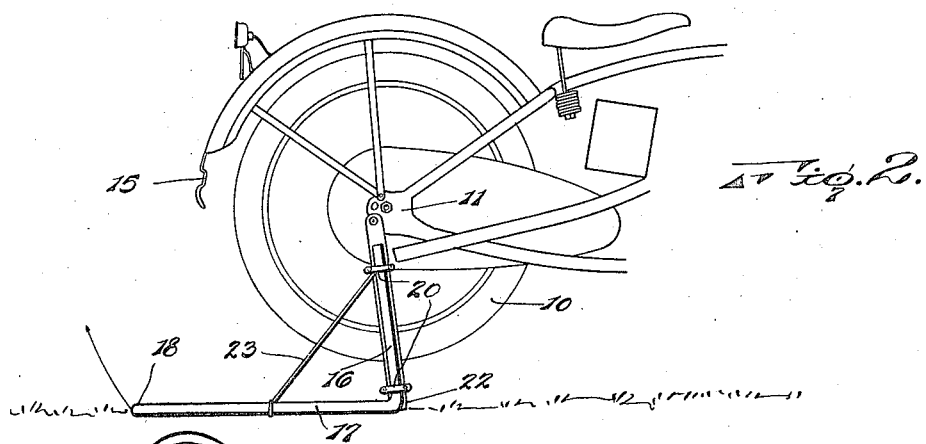
Figure 2 is a similar view with the stand in operative position.

The use of the device is as follows: The stand in travelling position is carried, as indicated in Figure 1. That is to say the foot portion 17 is in upright position and the leg portions 16 are approximately horizontal with the latch 15 engaging at the heel 22 of the device. Directly the rider has dismounted, he takes hold of the motorcycle, for instance its seat, with both hands to hold it upright and, after releasing the latch 15, presses downward with his foot at the extreme point A when the stand will first take the position indicated in dot and dash lines in Figure 1 with the heel 22 resting on the ground. Applying continued pressure at point A of the stand the heel 22 will act as a fulcrum to raise the hind wheel of the motorcycle, which in this manner will be lifted with great ease until finally the foot portion 17 rests flat on the ground, as indicated in Figure 2.

The device is applicable to ordinary bicycles as well as motorcycles or any other form of velocipedes and, when the term bicycle is used in the claim, this is meant to cover all kinds of such vehicles.

Having thus described the invention, what is claimed as new is:

The combination with a bicycle, and a stand pivoted on the bearing for the rear wheel of the bicycle, of a double bent rod forming straight foot and leg portions united at the front ends of the foot portions and forming heels at the junctures of said portions, the leg portions being longer than the radius of the bicycle wheel and being disposed against the sides of the said stand, and clips securing said leg portions to the sides of the stand.

In testimony whereof I affix my signature.

WARREN H. PERRIGO.